(12) United States Patent
Monti

(10) Patent No.: US 10,011,374 B2
(45) Date of Patent: Jul. 3, 2018

(54) APPARATUS FOR INJECTING A DOSED QUANTITY OF MEDICINAL LIQUID INTERNALLY OF A BOTTLE

(71) Applicant: MARCHESINI GROUP S.p.A., Pianoro (IT)

(72) Inventor: Giuseppe Monti, Pianoro (IT)

(73) Assignee: MARCHESINI GROUP S.p.A., Pianoro (BO) (IT)

(*) Notice: Subject to any disclaimer, the term of this patent is extended or adjusted under 35 U.S.C. 154(b) by 100 days.

(21) Appl. No.: 15/104,174

(22) PCT Filed: Dec. 17, 2014

(86) PCT No.: PCT/IB2014/067020
§ 371 (c)(1),
(2) Date: Jun. 13, 2016

(87) PCT Pub. No.: WO2015/092708
PCT Pub. Date: Jun. 25, 2015

(65) Prior Publication Data
US 2017/0029143 A1    Feb. 2, 2017

(30) Foreign Application Priority Data
Dec. 20, 2013 (IT) .............................. BO2013A0699

(51) Int. Cl.
*B65B 3/00* (2006.01)
*B65B 39/00* (2006.01)
(Continued)

(52) U.S. Cl.
CPC .................. *B65B 3/003* (2013.01); *A61J 1/05* (2013.01); *B65B 3/32* (2013.01); *B65B 39/004* (2013.01);
(Continued)

(58) Field of Classification Search
CPC ......... B65B 3/003; B65B 3/32; B65B 39/004; F16K 31/086; G01F 11/021; G01F 11/027; G01F 11/029
(Continued)

(56) References Cited

U.S. PATENT DOCUMENTS 4,349,042 A * 9/1982 Shimizu .................. F16K 17/36
137/39
5,069,239 A * 12/1991 Bunce .................... F16K 31/086
137/15.04
(Continued)

FOREIGN PATENT DOCUMENTS

DE     35 15 848 A1    11/1986
EP     2 112 066 A1    10/2009
(Continued)

*Primary Examiner* — Timothy L Maust
(74) *Attorney, Agent, or Firm* — R. Neil Sudol; Henry D. Coleman

(57) ABSTRACT

An apparatus for injecting a dose of medication into a bottle includes a tank, an outlet or mouth, a doser, and a conduit connecting the tank, the outlet mouth and the doser to each other. The conduit includes a portion disposed between the doser and the outlet mouth. The apparatus additionally includes a valve and a cursor movable internally of the portion of the conduit between an occluding position and an enabling position. A first magnet is borne by the cursor, while a second magnet arranged externally of the conduit is movable beside the conduit and interacts magnetically with the first magnet so that the second magnet is able to draw the cursor between the occluding position and the enabling position.

10 Claims, 4 Drawing Sheets

(51) Int. Cl.
  *B65B 3/32* (2006.01)
  *G01F 11/02* (2006.01)
  *A61J 1/05* (2006.01)
  *F16K 31/08* (2006.01)
(52) U.S. Cl.
  CPC .......... *F16K 31/086* (2013.01); *G01F 11/021* (2013.01); *G01F 11/029* (2013.01)
(58) Field of Classification Search
  USPC ............... 141/27, 57, 144–147, 301, 302
  See application file for complete search history.

(56) References Cited

U.S. PATENT DOCUMENTS

| | | | |
|---|---|---|---|
| 5,309,955 A * | 5/1994 | Torterotot | B65B 3/32 141/1 |
| 5,417,260 A * | 5/1995 | Perrier | B67C 3/206 141/140 |
| 5,450,877 A * | 9/1995 | Graffin | F16K 31/086 137/630.14 |
| 5,779,147 A * | 7/1998 | Rosse | B65B 39/001 137/853 |
| 6,321,798 B1 * | 11/2001 | Solignac | B01F 15/0234 141/192 |
| 6,336,572 B1 * | 1/2002 | Fujikawa | B67C 3/206 141/103 |
| 6,375,050 B1 * | 4/2002 | Gruson | B67C 3/2608 137/614.11 |
| 7,171,981 B2 * | 2/2007 | Shade | F16K 15/04 137/375 |
| 7,690,625 B2 * | 4/2010 | Sabiron | F16K 31/086 251/129.14 |
| 7,717,396 B2 * | 5/2010 | Graffin | H01F 7/0242 251/65 |
| 2003/0221616 A1 | 12/2003 | Carpenter et al. | |
| 2012/0285564 A1 | 11/2012 | Airaksinen | |

FOREIGN PATENT DOCUMENTS

FR 1 383 087 A 12/1964
FR 2 881 500 A1 8/2006

* cited by examiner

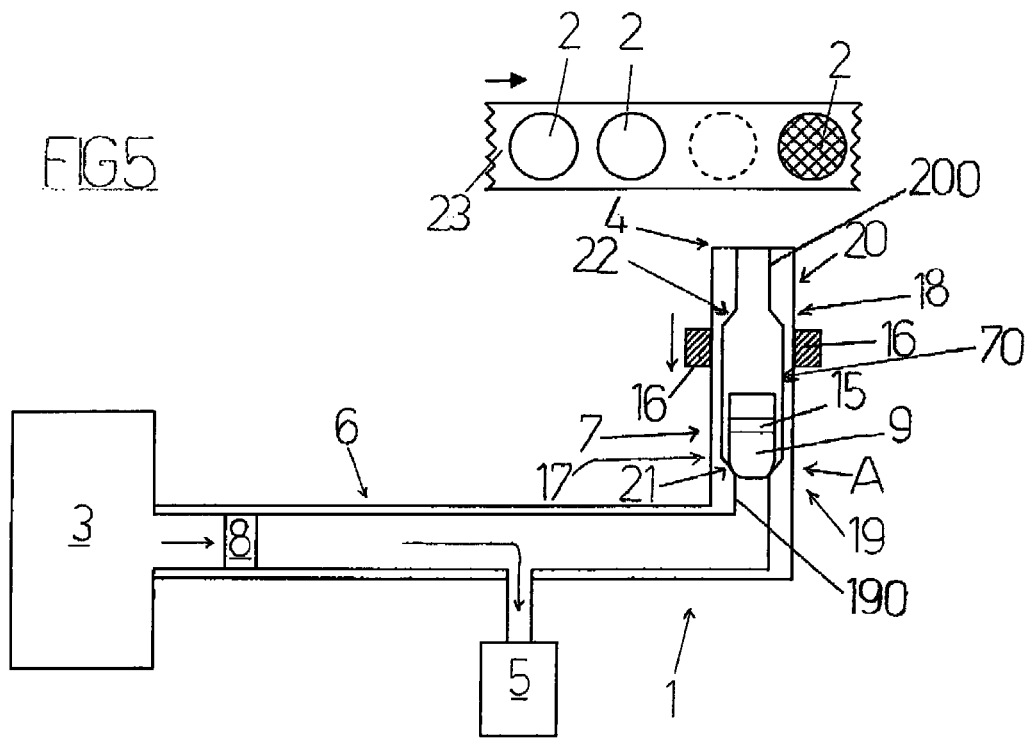
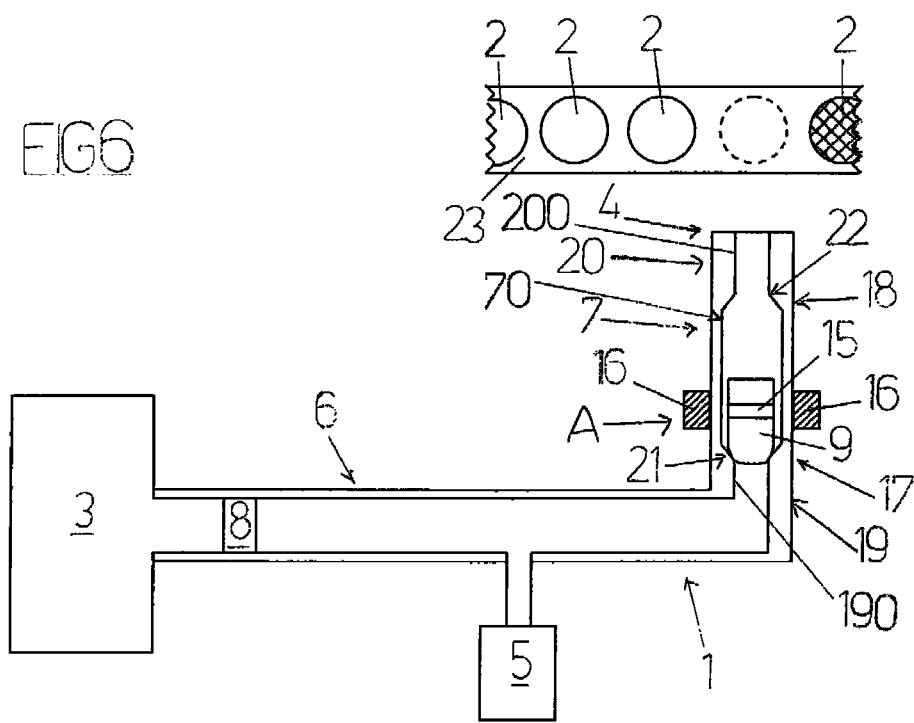

APPARATUS FOR INJECTING A DOSED QUANTITY OF MEDICINAL LIQUID INTERNALLY OF A BOTTLE

FIELD OF THE INVENTION

The present invention relates to the technical sector concerning an apparatus for injecting a dosed quantity of medicinal liquid internally of a bottle.

DESCRIPTION OF THE PRIOR ART

With reference to FIG. 1 in the prior art, an apparatus (1) is known which comprises: a tank (3) containing a medicinal liquid; an outlet mouth (4); a doser (5) for receiving the medicinal liquid from the tank (3) and for expelling a dosed quantity of medicinal liquid through the outlet mouth (4) and internally of a bottle (2); a conduit (6) connecting the tank (3), the doser (5) and the outlet mouth (4) to one another, which conduit (6) comprises a first portion (7) of conduit (6) which is interposed between the doser (5) and the outlet mouth (4); a valve (8) interposed along the conduit (6) between the tank (3) and the doser (5), so as to prevent or enable passage of medicinal liquid between the tank (3) and the doser (5); a first cursor (9) that is mobile internally of the first portion (7) of conduit (6) between an occluding position (A), in which it occludes passage of medicinal liquid towards the outlet mouth (4), and an enabled position (B) (not illustrated in FIG. 1), in which it enables passage of medicinal liquid towards the outlet mouth (4).

The apparatus (1) further comprises: a slot (12) realised in the first portion (7) of conduit (6); a gasket (not illustrated) applied at the slot (12) so as to prevent undesired leakage of medicinal liquid through the slot (12); a drawing rod (13) for drawing the first cursor (9) along the first portion (7) of conduit (6) between the occluding position (A) and the enabled position, which drawing rod (13) is fixed to the first cursor (9) and crosses the slot (12), projecting externally of the first portion (7) of conduit (6); and an actuator (14) which activates the drawing rod (13).

The above-described apparatus (1) requires periodical sanitising, as envisaged in the standards, since a medicinal liquid is used; this periodical sanitising, in particular, is necessary each time the medicinal liquid or the production batch is changed.

This apparatus (1), at the first portion (7) of conduit (6), of the gasket, of the drawing rod (13) and of the first cursor (9) exhibits interstices in which stagnant deposits of medicinal liquid can form. Consequently for an adequate sanitising, the apparatus (1) must be demounted and sent to an autoclave.

It is however evident that the sanitizing in the autoclave of the apparatus (1) as well as being time-consuming, since it includes demounting and reassembly of the apparatus (1), is expensive in terms of personnel too since it requires qualified operatives properly trained to demount and reassemble the apparatus (1). Further, with the sanitizing in the autoclave the apparatus (1) passes more time in the non-operative state than in a case where a sanitizing operation could be performed only on the apparatus (1), i.e. of the CIP-SIP type (Cleaning in Place-Sterilizing in Place).

SUMMARY OF THE INVENTION

In the light of the above, the aim of the present invention consists in obviating the above-cited drawback.

The above aim is obtained with an apparatus for injecting a dosed quantity of medicinal liquid internally of a bottle, according to claim 1.

The movement of the first cursor is done by means of magnetic interaction between the first magnet, borne by the first cursor, and the second magnet, located externally of the conduit: this advantageously enables eliminating the presence of interstices in which the medicinal liquid can stagnate.

Therefore the apparatus of the invention can be sanitised effectively by a CIP-SIP type sterilisation, with a saving in terms of time, as in order to be sanitised the apparatus does not require demounting and re-assembly, and therefore an increase in productivity and a saving in terms of costs are attained, as no specialized personnel is required and formed to demount and reassemble the apparatus.

BRIEF DESCRIPTION OF THE DRAWINGS

Specific embodiments of the invention will be described in the following of the present description, according to what is reported in the claims and with the aid of the accompanying tables of drawings, in which:

FIG. 5 schematically illustrates, in plan view, with some parts sectioned, the apparatus of FIG. 3 during a faulty functioning condition;

FIG. 6 schematically illustrates, in plan view, with some parts sectioned, the apparatus of FIG. 4 during a faulty functioning condition;

DESCRIPTION OF PREFERRED EMBODIMENTS

Figure 1:
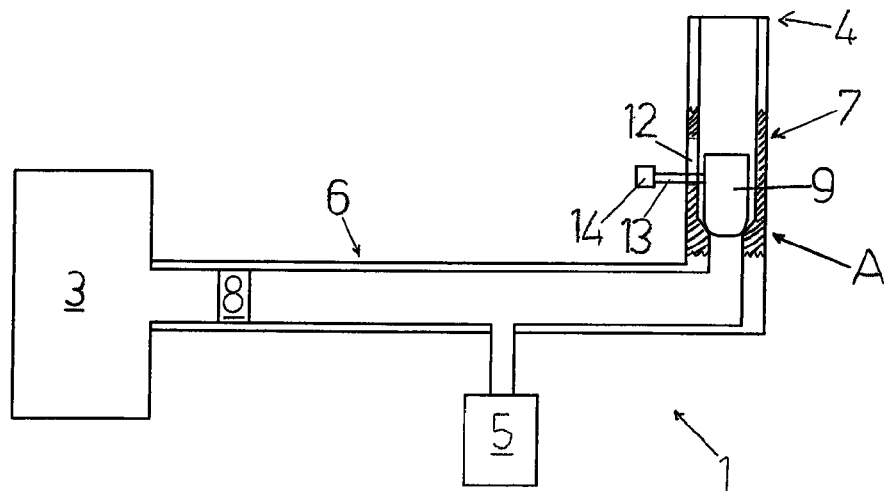
FIG. 1 schematically illustrates, in plan view and with some parts sectioned, an apparatus of the prior art comprising a first cursor arranged in an occluding position.

With reference to the accompanying tables of drawings, (1) denotes an apparatus, object of the invention, for injecting a dosed quantity of medicinal liquid internally of a bottle (2).

The apparatus (1) comprises: a tank (3) containing a medicinal liquid; an outlet mouth (4); a doser (5) for receiving the medicinal liquid from the tank (3) and for expelling a dosed quantity of medicinal liquid through the outlet mouth (4) and internally of a bottle (2); a conduit (6) connecting the tank (3), the doser (5) and the outlet mouth (4) to one another, which conduit (6) comprises a first portion (7) of conduit (6) which is interposed between the doser (5) and the outlet mouth (4); a valve (8) interposed along the conduit (6) between the tank (3) and the doser (5), so as to prevent or enable passage of medicinal liquid between the tank (3) and the doser (5); a first cursor (9) that is mobile internally of the first portion (7) of conduit (6) between an occluding position (A), in which it occludes passage of medicinal liquid towards the outlet mouth (4), and an enabled position (B), in which it enables passage of medicinal liquid towards the outlet mouth (4).

Further the apparatus (1) comprises: a first magnet (15) which is borne by the first cursor (9); and a second magnet (16) which is arranged externally of the conduit (6), which is mobile by a side of the conduit (6) and which is able to interact magnetically with the first magnet (15) when the second magnet (16) is at the first portion (7) of the conduit (6), such that when the second magnet (16) moves by a side of the first portion (7) of conduit (6), the second magnet (16) is able to draw the first cursor (9) between the occluding position (A) and the enabled position (B).

The doser (5) preferably comprises a cylinder and a piston (not illustrated) which runs internally of the cylinder.

The second magnet (16) is preferably ring-conformed so as to embrace the first portion (7) of conduit (6).

The second magnet (16) is preferably commanded by an actuator so as to move by a side of the first portion (7) of conduit (6).

The apparatus (1) preferably comprises a cladding element which protects the second magnet (16).

The cladding element of the second magnet (16) is preferably made of a plastic material.

The first magnet (15) is preferably made of neodymium.

The second magnet (16) is preferably made of neodymium.

The second magnet (16) is preferably mobile parallel to the first portion (7) of conduit (6).

The first portion (7) of conduit (6) preferably develops between a first end (17) and a second end (18). Further, the conduit (6) comprises a second portion (19) of conduit (6), which borders with the first end (17) of the first portion (7) of conduit (6), and a third portion (20) of conduit (6), which borders with the second end (18) of the first portion (7) of conduit (6), and the apparatus (1) comprises a first abutment (21) arranged at the first end (17) of the first portion (7) of conduit (6), which halts the first cursor (9) when it reaches the occluding position (A).

The first abutment (21) and the first cursor (9) are preferably conformed such as to be sealed when the first cursor (9) is in abutment against the first abutment (21).

The first abutment (21) is preferably defined by a first change in transversal section of the first portion (7) of conduit (6); in particular, the first variation of transversal section can be defined by a variation in the internal diameter of the first portion (7) of conduit (6).

The apparatus (1) is preferably such that (see FIG. 2): the first portion of conduit (6) has an internal diameter that is greater with respect to the internal diameter of the second portion (19) of conduit (6); the internal wall (70) of the first portion (7) of conduit (6) comprises a first part (70a) and a second part (70b) which conjoins the first part (70a) to the internal wall (190) of the second portion (19) of conduit (6); the second part (70b) of the first portion (7) of conduit (6) forms, with the first part (70a) of the first portion (7) of conduit (6), an angle of greater than ninety degrees so that the first abutment (21) is identified by the change of internal diameter which is defined between the first part (70a) of the first portion (7) of conduit (6) and the internal wall (190) of the second portion (19) of conduit (6).

This configuration of the first abutment (21) preferably ensures absence, at the first abutment (21), of interstices in the conduit (6) in which the medicinal liquid can stagnate.

A supply line can be included, comprising a conveyor (23), which supplies bottles to be filled and which is arranged such that each bottle (2) can be filled with the medicinal liquid released from the outlet mouth (4).

Figure 2:
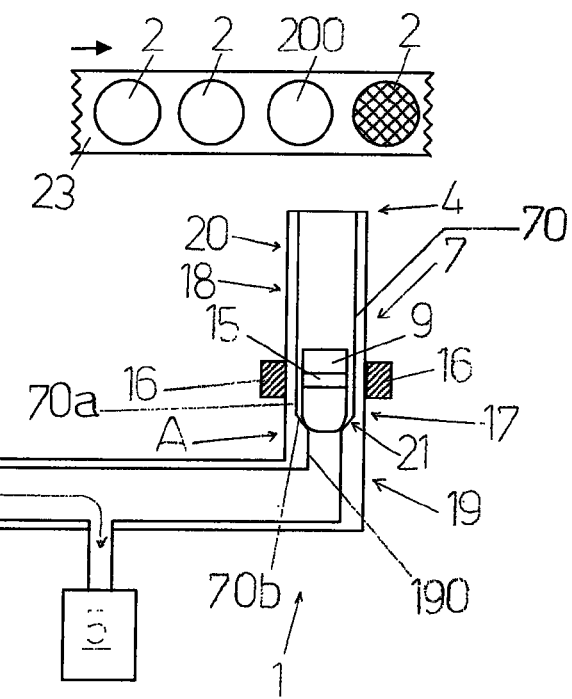
FIG. 2 schematically illustrates, in plan view, with some parts sectioned, a first embodiment of the apparatus of the invention.

In the following a first embodiment will be described, with reference to FIG. 2. FIG. 2 illustrates an operating step in which: the valve enables (8) passage of medicinal liquid; the doser (5) receives the medicinal liquid from the tank (3); the first cursor (9) is maintained in the occluding position (A) by the second magnet (16); a first empty bottle (200) is in arrival at the outlet mouth (4) in order to receive the medicinal liquid.

Once the doser (5) has accumulated a dosed quantity of medicinal liquid, the valve (8) is commanded to prevent a return of liquid into the tank (3), the doser (5) is activated such as to expel the dosed quantity of medicinal liquid and the second magnet (16) is activated so as to draw the first cursor (9) into the enabled position (not illustrated in FIG. 2), enabling the liquid in arrival from the doser (5) to exit from the outlet mouth (4) and fill the first empty bottle (200).

Thereafter the second magnet (16) is newly activated to bring the first cursor (9) into the occluding position (A) and a new operating cycle of the apparatus (1) is repeated.

In the following a second embodiment will be described, with reference to FIGS. 3-6. In this second embodiment the apparatus comprises a second abutment (22) arranged at the second end (18) of the first portion (7) of conduit (6), which halts the first cursor (9) when it reaches the enabled position (B). The second magnet (16) is positionable by a side of the second portion (19) of conduit (6) or by a side of the third portion (20) of conduit (6) in a rest position (C) in which it does not interact magnetically with the first magnet (15). The doser (5) is configured and arranged with respect to the first portion (7) of conduit (6) so that when it aspirates the medicinal liquid from the tank (3) a depression is created at the first portion (7) of conduit (6) which determines an abutment of the first cursor (9) against the first abutment (21), and that when it expels a dosed quantity of medicinal liquid an overpressure is created at the first portion (7) of conduit (6) which determines an abutment of the first cursor (9) against the second abutment (22).

The second abutment (22) is preferably interposed between the first abutment (21) and the outlet mouth (4).

When the first cursor (9) is abutting against the second abutment (22) the medicinal liquid can flow towards the outlet mouth (4).

The second abutment (22) is preferably defined by a second change in transversal section of the first portion (7) of conduit (6); in particular, the second change in transversal section can be defined by a change in the internal diameter of the first portion (7) of conduit (6).

The apparatus (1) is preferably such that (see FIG. 4): the first portion (7) of conduit (6) has an internal diameter that is greater with respect to the internal diameter of the third portion (20) of conduit (6); the internal wall (70) of the first portion (7) of conduit (6) comprises a first part (70a) and a third part (70c) which conjoins the first part (70a) with the internal wall (200) of the third portion (20) of conduit (6); the third part (70c) of the first portion (7) of conduit (6) forms, with the first part (70a) of the first portion (7) of conduit (6), an angle of greater than ninety degrees so that the second abutment (22) is identified by the change of internal diameter that is defined between the first part (70a) of the first portion (7) of conduit (6) and the internal wall (200) of the third part (20) of conduit (6).

This configuration of the second abutment (22) advantageously ensures an absence, at the second abutment (22) of interstices in the conduit (6) in which the medicinal liquid might stagnate.

The internal diameter of the first portion (7) of conduit (6) is preferably greater than the internal diameter of the second portion (19) of conduit (6) of the third portion (20) of conduit (6).

Figure 3:
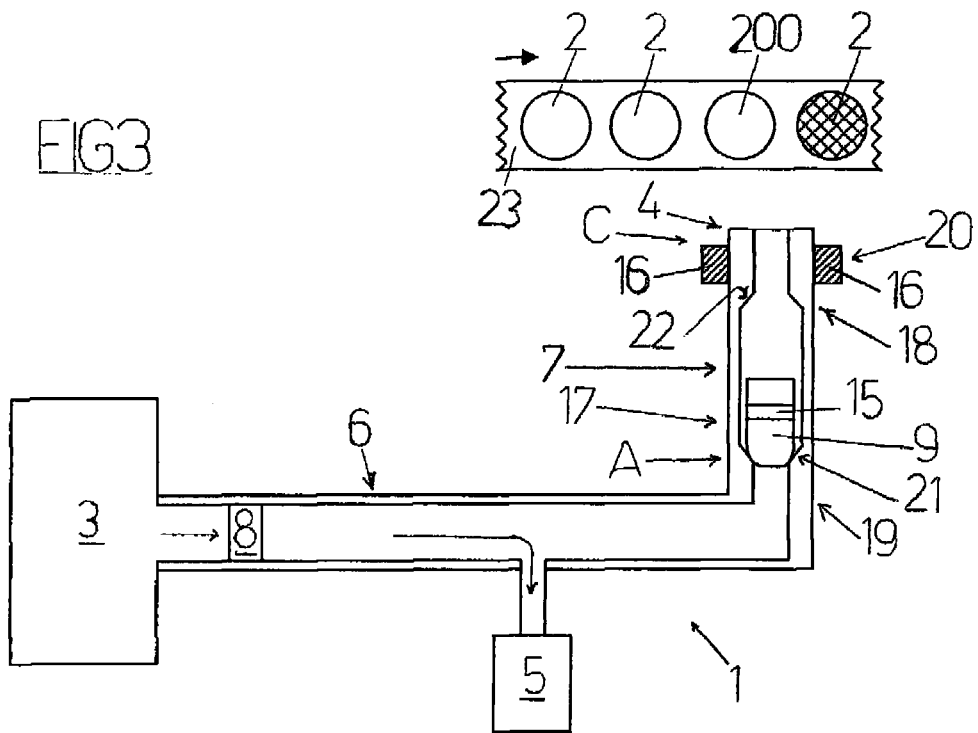
FIG. 3 illustrates, in plan view, with some parts sectioned, a second embodiment of the apparatus of the invention during a first step of an operating cycle.

FIG. 3 illustrates the second embodiment of the apparatus (1), object of the invention, during a first step of an operating cycle in which: the valve (8) enables passage of the medicinal liquid; the doser (5) receives the medicinal liquid from the tank (3); the first cursor (9) is in the occluding position (A); a first empty bottle (200) is moving to the outlet mouth (4) so as to receive the medicinal liquid; the second magnet (16) is in the rest position (C) and does not interact magnetically with the first magnet (15). The first cursor (9) is maintained pressed against the first abutment (21) by the depression generated in the first portion (7) of conduit (6) by effect of the aspiration of the medicinal liquid from the doser (5). After the doser (5) has accumulated a dosed quantity of medicinal liquid, the valve (8) is commanded to prevent a return of medicinal liquids into the tank (3) and the doser (5) is activated to expel the dosed quantity of medicinal liquid (in the second step of the operating cycle illustrated in FIG. 4); this causes an overpressure in the first portion (7) of the conduit (6) which pushes the first cursor (9) towards the enabled position (B) up to abutting with the second abutment (22), which determines the exit of medicinal liquid through the outlet mouth (4) and internally of the first bottle (200), which is thus filled with the above-mentioned dosed quantity of medicinal liquid.

The operating liquid repeats by newly actuating the valve (8) so as to enable the passage of medicinal liquid and activating the doser (5) to aspirate a dosed quantity of medicinal liquid from the tank (3), which creates a depression in the first portion (7) of conduit (6) which determines the abutting of the first cursor (9) against the first abutment (21) (once more see FIG. 3).

The depression and the overpressure created by the doser (5) in the first portion (7) of conduit (6) can be sufficient, as described above, to move the first cursor (9) between an occluding position (A) and an enabled position (B). If the medicinal liquid has a degree of viscosity that exceeds a certain limit, it can however be advisable to supplement the movement of the first cursor (9) by means of the second magnet (16); in this case, the activation of the doser (5) will preferably be synchronized with the activation of the second magnet (16) in order to draw the first cursor (9). Differently, the second magnet (16) can remain in the rest position (C) during each operating cycle.

Figure 4:
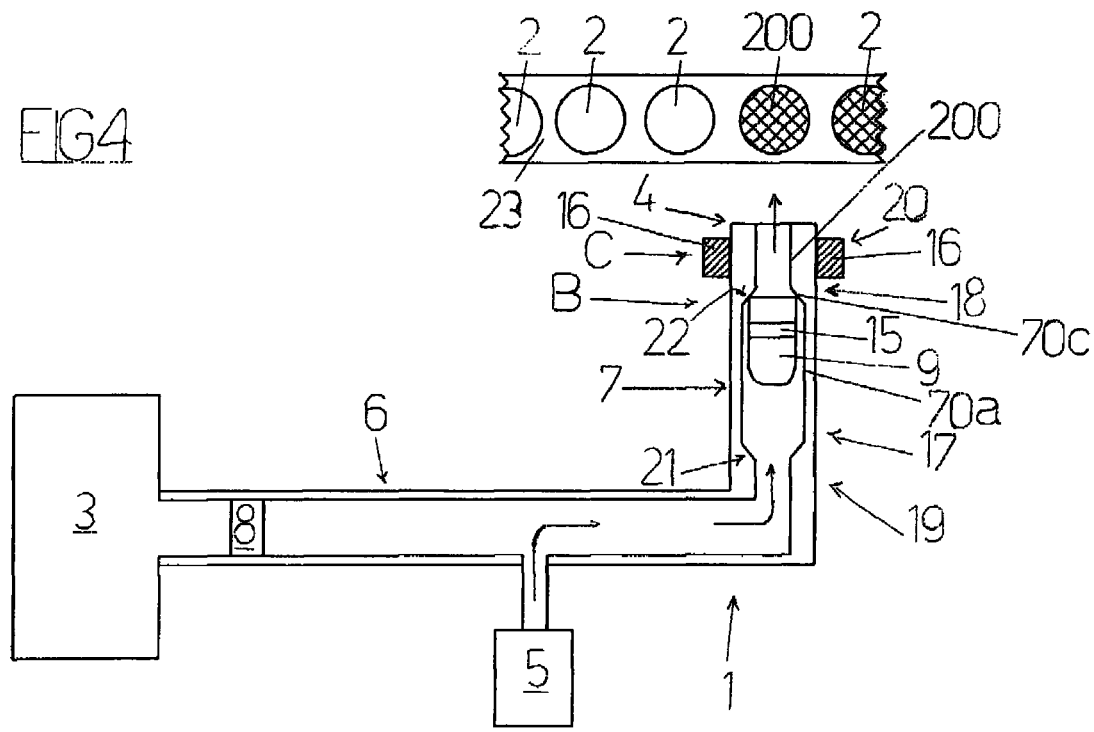
FIG. 4 schematically illustrates, in plan view, with some parts sectioned, the apparatus of FIG. 3 during a second step of an operating cycle.

FIGS. 5, 6 are similar respectively to FIGS. 3 and 4 as they illustrate the second embodiment of the apparatus (1) of the invention during, however, a faulty functioning condition. In particular they illustrate the apparatus (1) in a case in which the supply line is missing a bottle to fill, for example because the bottle was previously rejected due to a manufacturing defect.

In this case, as illustrated in FIG. 5, the second magnet (16) must be brought from the rest position (C) to a position by a side of the first portion (7) of conduit (6) in which it magnetically interacts with the first magnet (15) in order to maintain the first cursor (9) solidly in the occluding position (A): in this way an undesired leakage of medicinal liquid through the outlet mouth (4) is prevented, which would foul the conveyor (23) of the supply line. The doser (5) can be activated so as aspirate a dosed quantity of medicinal liquid (FIG. 5) but must remain inactive during the step of the operating cycle in which the bottle (2) to be filled is missing, in the sense that it must not be activated to expel the dosed quantity of medicinal liquid. The dosed quantity of medicinal liquid can be expelled in the next operating cycle, in which the normal functioning of the apparatus (1) will be restored and the second magnet (16) will newly return into the rest position (C).

If the medicinal liquid has a degree of viscosity below the above-cited limit, the second magnet (16) can be commanded only in anomalous situations, such as for example in the case of the lack of a bottle (2) to be filled at the outlet mouth (4).

In a case where it is not possible to alter the functioning of the doser (5) and there is no bottle (2) to be filled at the outlet mouth (4), then it is possible to include a discharge (25) for discharging the medicinal liquid (illustrated in FIG. 7 with reference to a third embodiment); this discharge (25) might also be a by-pass conduit (this solution is not illustrated) which returns to the tank (3).

Figure 7:
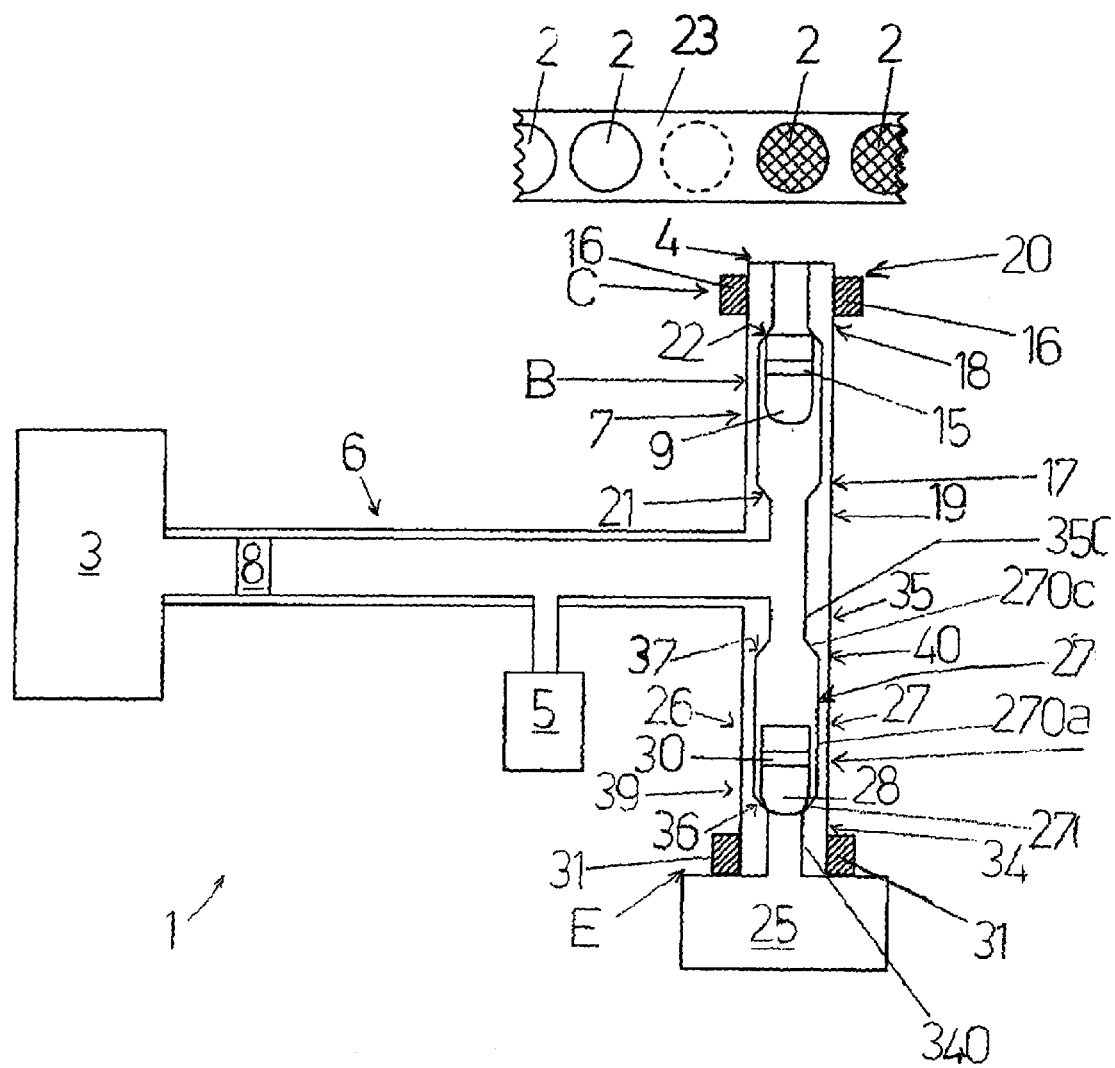
FIG. 7 schematically illustrates, in plan view, with some parts sectioned, a third embodiment of the apparatus of the invention.

The third embodiment, illustrated in FIG. 7, is applied on the second embodiment and will be described in the following. The apparatus (1) comprises: a discharge (25); a discharge conduit (26) which originates in the conduit (6), between the valve (8) and the first portion (7) of conduit (6), and which terminates in the discharge (25), which discharge conduit (26) comprises a first portion (27) of discharge conduit (26); a second cursor (28) mobile internally of the first portion (27) of discharge conduit (26) between an occluding position (D), in which it prevents passage of medicinal liquid towards the discharge (25), and an enabled position (not illustrated), in which it enables passage of medicinal liquid towards the discharge (25); a third magnet (30) which is borne by the second cursor (28); a fourth magnet (31) which is arranged externally of the discharge conduit (26), which is mobile by a side of the discharge conduit (26) and which is able to interact magnetically with the third magnet (30) when the fourth magnet (31) is at the first portion (27) of discharge conduit (26), so that when the fourth magnet (31) moves by a side of the first portion (27) of discharge conduit (26) the fourth magnet (31) is able to draw the second cursor (28) between the occluding position (D) and the enabled position.

The fourth magnet (31) is preferably ring-conformed so as to embrace the first portion (27) of discharge conduit (26).

The fourth magnet (31) is preferably commanded by an actuator so as to move by a side of the first portion (27) of discharge conduit (26).

The apparatus (1) preferably comprises a cladding element which protects the fourth magnet (31).

The cladding element of the fourth magnet (31) is preferably made of a plastic material.

The third magnet (30) is preferably made of neodymium.

The fourth magnet (31) is preferably made of neodymium.

The fourth magnet (31) is preferably mobile parallel to the first portion (27) of discharge conduit (26).

The first portion (27) of discharge conduit (26) preferably develops between a first end (39) and a second end (40); the discharge conduit (26) comprises a second portion (34) of discharge conduit (26), which borders with the first end (39) of the first portion (27) of discharge conduit (26), and a third portion (35) of discharge conduit (26), which borders with the second end (40) of the first portion (27) of discharge conduit (26). The apparatus also comprises a third abutment (36) arranged at the first end (39) of the first portion (27) of discharge conduit (26), which halts the second cursor (28) when it reaches the occluding position (D).

The third abutment (36) and the second abutment (28) are preferably conformed so as to be sealed when the second cursor (28) is abutting against the third abutment (36).

The third abutment (36) is preferably defined by a first change of transversal section of the first portion (27) of discharge conduit (26); in particular, the first change of transversal section can be defined by a change of internal diameter of the first portion (27) of the discharge conduit (26).

The apparatus is preferably such that: the first portion (27) of discharge conduit (26) has an internal diameter that is greater than the internal diameter of the second portion (34) of discharge conduit (26); the internal wall (270) of the first portion (27) of discharge conduit (26) comprises a first part (270a) and a second part (270b) which conjoins the first part (270a) with the internal wall (340) of the second portion (24) of discharge conduit (26); the second part (270b) of the first portion (27) of discharge conduit (26) forms, with the first part (270a) of the first portion (27) of discharge conduit (26), an angle of greater than ninety degrees so that the third abutment (36) is identified by the change of internal diameter which is defined between the first part (270a) of the first portion (27) of the discharge conduit (26) and the internal wall (340) of the second portion (34) of discharge conduit (26).

This configuration of the third abutment (36) advantageously ensures an absence, at the third abutment (36), of interstices of the discharge conduit (26) in which the medicinal liquid might stagnate.

The apparatus preferably comprises a fourth abutment (37) arranged at the second end (40) of the first portion (27) of discharge conduit (26), which halts the second cursor (28) when it reaches the enabled position; the fourth magnet (31) is positionable by a side of the second portion (34) of discharge conduit (26) or by a side of the third portion (35) of discharge conduit (26) in a rest position (E) in which it does not interact magnetically with the third magnet (30); the doser (5) is configured and arranged with respect to the first portion (27) of discharge conduit (26) in such a way that when it aspirates the medicinal liquid from the tank (3) a depression is created at the first portion (27) of discharge conduit (26) which determines an abutment of the second cursor (28) against the fourth abutment (37) and which when it expels a dosed quantity of medicinal liquid an overpressure is created at the first portion (27) of discharge conduit (26) which determines an abutment of the second cursor (28) against the third abutment (36).

The third abutment (36) is preferably interposed between the fourth abutment (37) and the discharge (25).

The fourth abutment (37) is preferably by a second change of transversal section of the first portion (27) of discharge conduit (26); in particular, the second change of transversal section can be defined by a change of the internal diameter of the first portion (27) of discharge conduit (26).

The apparatus (1) is preferably such that: the first portion (27) of discharge conduit (26) has an internal diameter that is greater than the internal diameter of the third portion (35) of discharge conduit (26); the internal wall (270) of the first portion (27) of discharge conduit (26) comprises a first part (270a) and a third part (270c) which conjoins the first part (270a) with the internal wall (350) of the third portion (35) of discharge conduit (26); the third part (270c) of the first portion (27) of discharge conduit (26) forms, with the first part (270a) of the first portion (27) of discharge conduit (26), an angle of greater than ninety degrees so that the fourth abutment (37) is identified by the change of internal diameter which is defined between the first part (270a) of the first portion (27) of discharge conduit (26) and the internal wall (350) of the third portion (35) of discharge conduit (26).

This configuration of the fourth abutment (37) advantageously ensures an absence, at the fourth abutment (37), of interstices in the discharge conduit (26) in which the medicinal liquid might stagnate.

The internal diameter of the first portion (27) of discharge conduit (6) is preferably greater than the internal diameter of the second portion (34) of discharge conduit (26) and a the third portion (35) of the discharge conduit (26).

The functioning of the apparatus of the third embodiment is substantially alike to the one described in the foregoing, with reference to FIGS. 3, 4 for the second embodiment: when the doser (5) aspirates the medicinal liquid from the tank, the depression created in the first portion (27) of discharge conduit (26) determines the abutting of the second cursor (28) against the fourth abutment (37), without this causing any return of medicinal liquid from the discharge (25); when the doser (5) expels a dosed quantity of medicinal liquid an overpressure is created at the first portion (7) of conduit (6) which determines an abutment of the second cursor (28) against the third abutment (36), which determines the occlusion of the first portion (27) of discharge conduit (26). During normal functioning of the apparatus, and if the medicinal liquid has a degree of viscosity below the above-mentioned limit, the fourth magnet (31) can be maintained in the rest position (E). It might otherwise be advisable to supplement the movement of the second cursor (28) by means of the fourth magnet (31): in this case the activation of the doser (5) will preferably be synchronized with the activation not only of the second magnet (16) but also of the fourth magnet (31) so as respectively to draw the first cursor (9) and the second cursor (28).

Like the functioning of the apparatus described with reference to FIGS. 5 and 6, when for example there is no bottle (2) to be filled from the supply line, the fourth magnet (31) can be moved from the rest position (E) to a flanked position to the first portion (27) of discharge conduit (26) in which it interacts magnetically with the third magnet (30) so as to solidly maintain the second cursor (28) in the second occluding position (D), enabling the medicinal liquid coming from the doser (5) to flow towards the discharge (25).

The invention claimed is:
1. An apparatus for injecting a dosed quantity of medicinal liquid internally of a bottle, comprising:
a tank containing a medicinal liquid;
an outlet mouth;
a doser for receiving the medicinal liquid from the tank and for expelling a dosed quantity of medicinal liquid through the outlet mouth and internally of a bottle;
a conduit connecting the tank, the doser and the outlet mouth to one another, which conduit comprises a first portion of the conduit which is interposed between the doser and the outlet mouth;
a valve interposed along the conduit between the tank and the doser, so as to prevent or enable passage of medicinal liquid between the tank and the doser;
a first cursor that is mobile internally of the first portion of the conduit between an occluding position, in which it occludes passage of medicinal liquid towards the outlet mouth, and an enabled position, in which it enables passage of medicinal liquid towards the outlet mouth, further comprising: a first magnet which is borne by the first cursor;

a second magnet which is arranged externally of the conduit, which is mobile by a side of the conduit and which is able to interact magnetically with the first magnet when the second magnet is at the first portion of the conduit, such that when the second magnet moves by a side of the first portion of the conduit, the second magnet is able to draw the first cursor between the occluding position and the enabled position, wherein:

the first portion of the conduit develops between a first end and a second end;

the conduit comprises a second portion of the conduit, which borders with the first end of the first portion of the conduit, and a third portion of the conduit, which borders with the second end of the first portion of the conduit;

a first abutment is arranged at the first end of the first portion of the conduit, which halts the first cursor when the first cursor reaches the occluding position; and a second abutment is arranged at the second end of the first portion of the conduit, which halts the first cursor when the first cursor reaches the enabled position; and wherein:

the second magnet is positionable by a side of the second portion of the conduit or by a side of the third portion of the conduit in a rest position in which the second magnet does not interact magnetically with the first magnet; and the doser is configured and arranged with respect to the first portion of the conduit so that when the doser aspirates the medicinal liquid from the tank a depression is created at the first portion of the conduit which determines an abutment of the first cursor against the first abutment, and that when the doser expels a dosed quantity of medicinal liquid an overpressure is created at the first portion of the conduit which determines an abutment of the first cursor against the second abutment.

2. The apparatus of claim 1, wherein the first abutment is defined by a first change in transversal section of the first portion of the conduit.

3. An apparatus for injecting a dosed quantity of medicinal liquid internally of a bottle, comprising:

a tank containing a medicinal liquid;

a doser for receiving the medicinal liquid from the tank and for expelling a dosed quantity of medicinal liquid through the outlet mouth and internally of a bottle;

a conduit connecting the tank, the doser and the outlet mouth to one another, which conduit comprises a first portion of the conduit which is interposed between the doser and the outlet mouth;

a valve interposed along the conduit between the tank and the doser, so as to prevent or enable passage of medicinal liquid between the tank and the doser; and a first cursor that is mobile internally of the first portion of the conduit between an occluding position, in which it occludes passage of medicinal liquid towards the outlet mouth, and an enabled position, in which it enables passage of medicinal liquid towards the outlet mouth, further comprising:

a first magnet which is borne by the first cursor; and a second magnet which is arranged externally of the conduit, which is mobile by a side of the conduit and which is able to interact magnetically with the first magnet when the second magnet is at the first portion of the conduit, such that when the second magnet moves by a side of the first portion of the conduit, the second magnet is able to draw the first cursor between the occluding position and the enabled position, wherein:

the first portion of the conduit develops between a first end and a second end; and the conduit comprises a second portion of the conduit, which borders with the first end of the first portion of the conduit, and a third portion of the conduit, which borders with the second end of the first portion of the conduit;

further comprising a first abutment arranged at the first end of the first portion of the conduit, which halts the first cursor when the first cursor reaches the occluding position, wherein:

the first portion of the conduit has an internal diameter that is greater with respect to the internal diameter of the second portion of the conduit;

the internal wall of the first portion of the conduit comprises a first part and a second part which conjoins the first part to the internal wall of the second portion of the conduit;

the second part of the first portion of the conduit forms, with the first part of the first portion of the conduit, an angle of greater than ninety degrees so that the first abutment is identified by the change of internal diameter which is defined between the first part of the first portion of the conduit and the internal wall of the second portion of the conduit.

4. The apparatus of claim 1, wherein the second abutment is defined by a second change in transversal section of the first portion of the conduit.

5. The apparatus of claim 1, wherein:

the first portion of the conduit has an internal diameter that is greater with respect to an internal diameter of the third portion of the conduit;

the internal wall of the first portion of the conduit comprises a first part and a third part which conjoins the first part with the internal wall of the third portion of the conduit; and the third part of the first portion of the conduit forms, with the first part of the first portion of the conduit, an angle of greater than ninety degrees so that the second abutment is identified by the change of internal diameter that is defined between the first part of the first portion of the conduit and the internal wall of the third part of the conduit.

6. An apparatus for injecting a dosed quantity of medicinal liquid internally of a bottle, comprising:

a tank containing a medicinal liquid;

an outlet mouth;

a doser for receiving the medicinal liquid from the tank and for expelling a dosed quantity of medicinal liquid through the outlet mouth and internally of a bottle;

a conduit connecting the tank, the doser and the outlet mouth to one another, which conduit comprises a first portion of the conduit which is interposed between the doser and the outlet mouth;

a valve interposed along the conduit between the tank and the doser, so as to prevent or enable passage of medicinal liquid between the tank and the doser; and a first cursor that is mobile internally of the first portion of the conduit between an occluding position, in which it occludes passage of medicinal liquid towards the outlet mouth, and an enabled position, in which it enables passage of medicinal liquid towards the outlet mouth, further comprising:

a first magnet which is borne by the first cursor; and a second magnet which is arranged externally of the conduit, which is mobile by a side of the conduit and which is able to interact magnetically with the first magnet when the second magnet is at the first portion of the conduit, such that when the second magnet moves by a side of the first portion of the conduit, the second magnet is able to draw the first cursor between the occluding position and the enabled position, further comprising:

a discharge;

a discharge conduit which originates in the conduit, between the valve and the first portion of the conduit, and which terminates in the discharge, which discharge conduit comprises a first portion of discharge conduit;

a second cursor mobile internally of the first portion of discharge conduit between an occluding position, in which it prevents passage of medicinal liquid towards the discharge, and an enabled position, in which it enables passage of medicinal liquid towards the discharge;

a third magnet which is borne by the second cursor; and a fourth magnet which is arranged externally of the discharge conduit, which is mobile by a side of the discharge conduit and which is able to interact magnetically with the third magnet when the fourth magnet is at the first portion of discharge conduit, so that when the fourth magnet moves by a side of the first portion of discharge conduit the fourth magnet is able to draw the second cursor between the occluding position and the enabled position.

7. The apparatus of claim 6, wherein:

the first portion of the discharge conduit develops between a first end and a second end; and the discharge conduit comprises a second portion of the discharge conduit, which borders with the first end of the first portion of the discharge conduit, and a third portion of the discharge conduit, which borders with the second end of the first portion of the discharge conduit;

further comprising a third abutment arranged at the first end of the first portion of the discharge conduit, which halts the second cursor when it reaches the occluding position.

8. The apparatus of claim 7, wherein:

the first portion of the discharge conduit has an internal diameter that is greater than the internal diameter of the second portion of the discharge conduit;

the internal wall of the first portion of the discharge conduit comprises a first part and a second part which conjoins the first part with the internal wall of the second portion of the discharge conduit; and the second part of the first portion of the discharge conduit forms, with the first part of the first portion of the discharge conduit, an angle of greater than ninety degrees so that the third abutment is identified by the change of internal diameter which is defined between the first part of the first portion of the discharge conduit and the internal wall of the second portion of the discharge conduit.

9. The apparatus of claim 7, further comprising a fourth abutment arranged at the second end of the first portion of the discharge conduit, which halts the second cursor when it reaches the enabled position;

wherein:

the fourth magnet is positionable by a side of the second portion of the discharge conduit or by a side of the third portion of the discharge conduit in a rest position in which it does not interact magnetically with the third magnet; and the doser is configured and arranged with respect to the first portion of the discharge conduit in such a way that when it aspirates the medicinal liquid from the tank a depression is created at the first portion of the discharge conduit which determines an abutment of the second cursor against the fourth abutment and which when it expels a dosed quantity of medicinal liquid an overpressure is created at the first portion of the discharge conduit which determines an abutment of the second cursor against the third abutment.

10. The apparatus of claim 9, wherein:

the first portion of the discharge conduit has an internal diameter that is greater than the internal diameter of the third portion of the discharge conduit;

the internal wall of the first portion of the discharge conduit comprises a first part and a third part which conjoins the first part with the internal wall of the third portion of the discharge conduit; and the third part of the first portion of the discharge conduit forms, with the first part of the first portion of the discharge conduit, an angle of greater than ninety degrees so that the fourth abutment is identified by the change of internal diameter which is defined between the first part of the first portion of the discharge conduit and the internal wall of the third portion of the discharge conduit.

* * * * *